United States Patent
Armbruster et al.

(10) Patent No.: US 7,156,448 B2
(45) Date of Patent: Jan. 2, 2007

(54) IMPACT PROTECTION SYSTEM FOR A DOOR OF A MOTOR VEHICLE

(75) Inventors: Reiner Armbruster, Muehlacker (DE); Andre Scholz, Wiernsheim (DE); Martin Goehrke, Loechgau (DE); Jens Zimmer, Leonberg (DE); Andreas Kohler, Bad Liebenzell (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 316 days.

(21) Appl. No.: 10/911,663

(22) Filed: Aug. 5, 2004

(65) Prior Publication Data

US 2005/0045402 A1    Mar. 3, 2005

(30) Foreign Application Priority Data

Aug. 27, 2003    (DE) ................. 103 39 307

(51) Int. Cl.
    *B60J 5/04*    (2006.01)
(52) U.S. Cl. ............. 296/146.6; 296/202; 296/146.9; 296/187.12; 49/502
(58) Field of Classification Search ........... 296/187.03, 296/193.06, 202, 150, 146.6, 146.9, 146.11, 296/187.12; 49/502; 52/731.6
    See application file for complete search history.

(56) References Cited

U.S. PATENT DOCUMENTS

| | | | |
|---|---|---|---|
| 3,791,693 A | | 2/1974 | Hellriegel |
| 4,328,642 A | * | 5/1982 | Presto ................. 49/502 |
| 4,434,580 A | * | 3/1984 | Engelsberger et al. ....... 49/502 |
| 5,470,125 A | * | 11/1995 | Yamazaki ............. 296/146.6 |
| 5,573,297 A | * | 11/1996 | DeRees et al. ......... 296/146.6 |
| 5,800,007 A | * | 9/1998 | Cho .................. 296/146.6 |
| 5,857,732 A | * | 1/1999 | Ritchie ............... 296/146.5 |
| 6,135,537 A | * | 10/2000 | Giddons .............. 296/146.6 |
| 6,205,714 B1 | * | 3/2001 | Staser et al. ............. 49/502 |
| 6,382,707 B1 | * | 5/2002 | Dunneback .......... 296/146.6 |
| 6,942,281 B1 | * | 9/2005 | Omori et al. ......... 296/146.6 |
| 6,957,844 B1 | * | 10/2005 | Chu et al. ............ 296/146.6 |
| 7,059,657 B1 | * | 6/2006 | Bodin et al. ......... 296/146.6 |
| 2002/0093219 A1 | * | 7/2002 | Traister et al. ....... 296/146.6 |
| 2004/0104593 A1 | * | 6/2004 | Nakagawa ........... 296/146.6 |
| 2004/0174041 A1 | * | 9/2004 | Graber et al. ........ 296/146.6 |
| 2005/0046228 A1 | * | 3/2005 | Armbuster et al. .... 296/146.6 |

FOREIGN PATENT DOCUMENTS

| | | |
|---|---|---|
| DE | 2 006 498 | 9/1971 |
| DE | 2 021 906 | 11/1971 |
| DE | 2 127 724 | 12/1972 |
| DE | 2 254 840 | 6/1973 |
| FR | 2 207 039 | 11/1972 |

* cited by examiner

*Primary Examiner*—Jason Morrow
(74) *Attorney, Agent, or Firm*—Crowell & Moring LLP

(57) ABSTRACT

An impact protection system is provided for a door of a motor vehicle and extends between upright door frames of a door body. On one side the impact protection system is connected with a hinge column by way of hinges and, on the other side, adjacent to a lock of the door, is connected with an additional column. The hinge column and additional column are integrated in a body structure of a body of the motor vehicle. In order to optimize this impact protection system, the lock is mounted on the latter and, in the closed condition of the door, an engaging device of the door interacts with a receiving device of a deformation device which is fastened to the additional column of the vehicle body structure.

30 Claims, 4 Drawing Sheets

IMPACT PROTECTION SYSTEM FOR A DOOR OF A MOTOR VEHICLE

BACKGROUND AND SUMMARY OF THE INVENTION

This application claims the priority of German Application No. 103 39 307.2-21 filed Aug. 27, 2003, the disclosure of which is expressly incorporated by reference herein.

The invention relates to an impact protection system for a door of a motor vehicle which extends between upright door frames of a door body and, on one side, is connected with a hinge column by way of hinges and, on the other side, adjacent to a lock of the door, is connected with an additional column, which hinge column and additional column are integrated in a body structure of a body of the motor vehicle.

A known door arrangement—French Patent Document FR 2.207.039—of a motor vehicle comprises two doors inserted into a side wall, into which doors impact protection systems are integrated. Each impact protection system is formed by two mutually spaced side members which are equipped with hinges on the side facing a hinge column and are supported on the side adjacent to a lock column by means of extensions on the lock column. Pins are mounted on the lock column which engage in openings of the extensions such that the extensions interact with the pins in the event of lateral loads of the side members.

German Patent Document DE 2 006 498 relates to a system for protecting occupants of motor vehicle which is arranged in a door, emerges on faces from the above-mentioned door and is anchored to adjoining columns of a body of the motor vehicle. This system is formed, for example, by a cable which is connected with the column by way of a coupling.

It is an object of the invention to provide an impact protection system for a door which, in the event of a side impact, in a targeted manner absorbs impact energy, among others, in the area of the lock column as a result of deformation work and tensile force absorption.

According to certain preferred embodiments of the invention, this object is achieved by providing an impact protection system for a door of a motor vehicle, which extends between upright door frames of a door body, and on one side, is connected with a hinge column by way of hinges and, on the other side, adjacent to a lock of the door, is connected with an additional column, which hinge column and additional column are integrated in a body structure of a body of the motor vehicle, wherein the lock is mounted on the impact protection system and, in a closed condition of the door, an engaging device of the door interacts with a receiving device of a deformation device which is fastened to the additional column of the vehicle body structure.

Further advantageous features of preferred embodiments of the invention are described herein and in the claims.

Important advantages achieved by means of the invention are that, as a result of the mounting of the lock on the impact protection system and the engagement of the above-mentioned lock in the deformation device on the column of the motor vehicle structure, the energy absorption in the event of a side impact is optimized by tensile forces acting upon the deformation device and its therefore initiated deformation work. In this case, the engaging device of the lock and the receiving device on the deformation device remain in a defined design position up to a defined shock load acting upon the impact protection system; that is, the lock is not released or opened. The deformation device is a component which can be produced by means of simple devices and can easily be integrated in the vehicle body structure. Finally, the impact protection system formed by consoles and supporting elements can be implemented by acceptable means and is distinguished by high strength while its weight is low, in which case the impact protection system can be a prefabricated module which can be inserted into the interior door part during the assembly of the door.

The drawing shows an embodiment of the invention which will be described in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
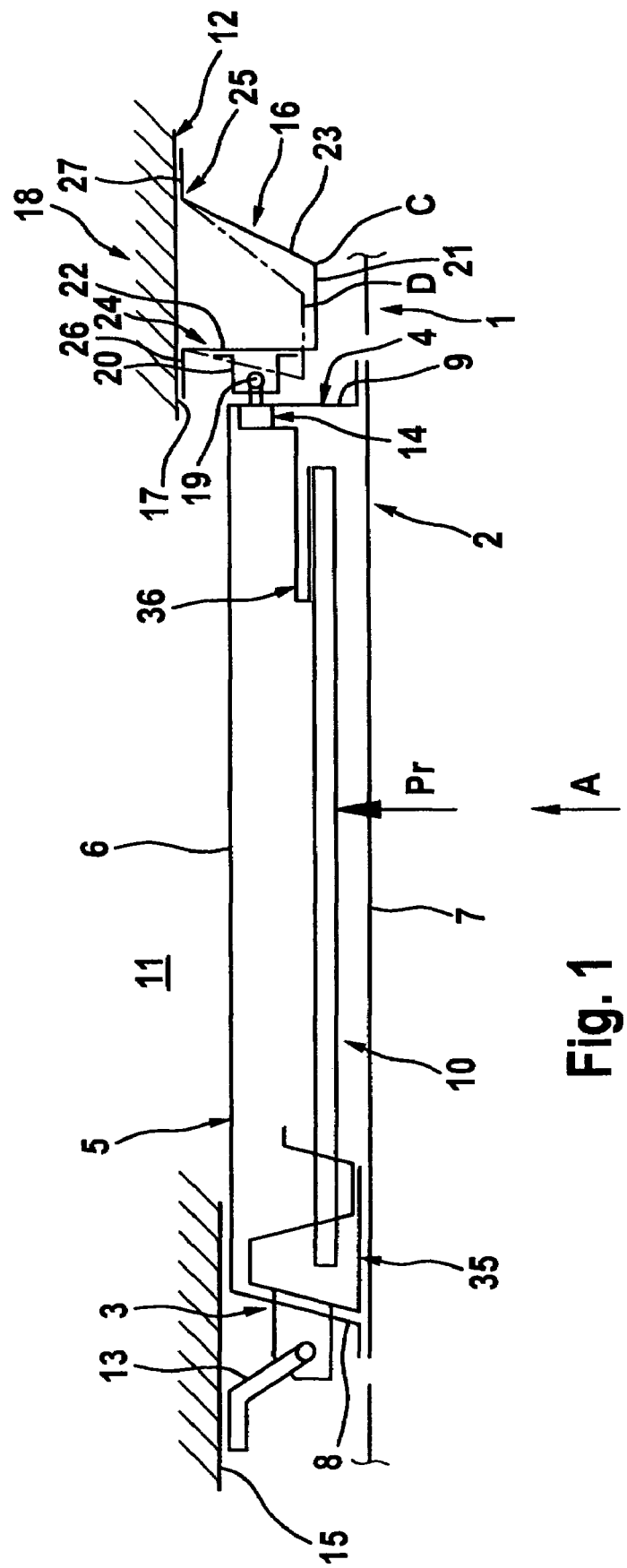
FIG. 1 is a schematic top view of a door for a motor vehicle with the impact protection system according to the invention.
Figure 2:
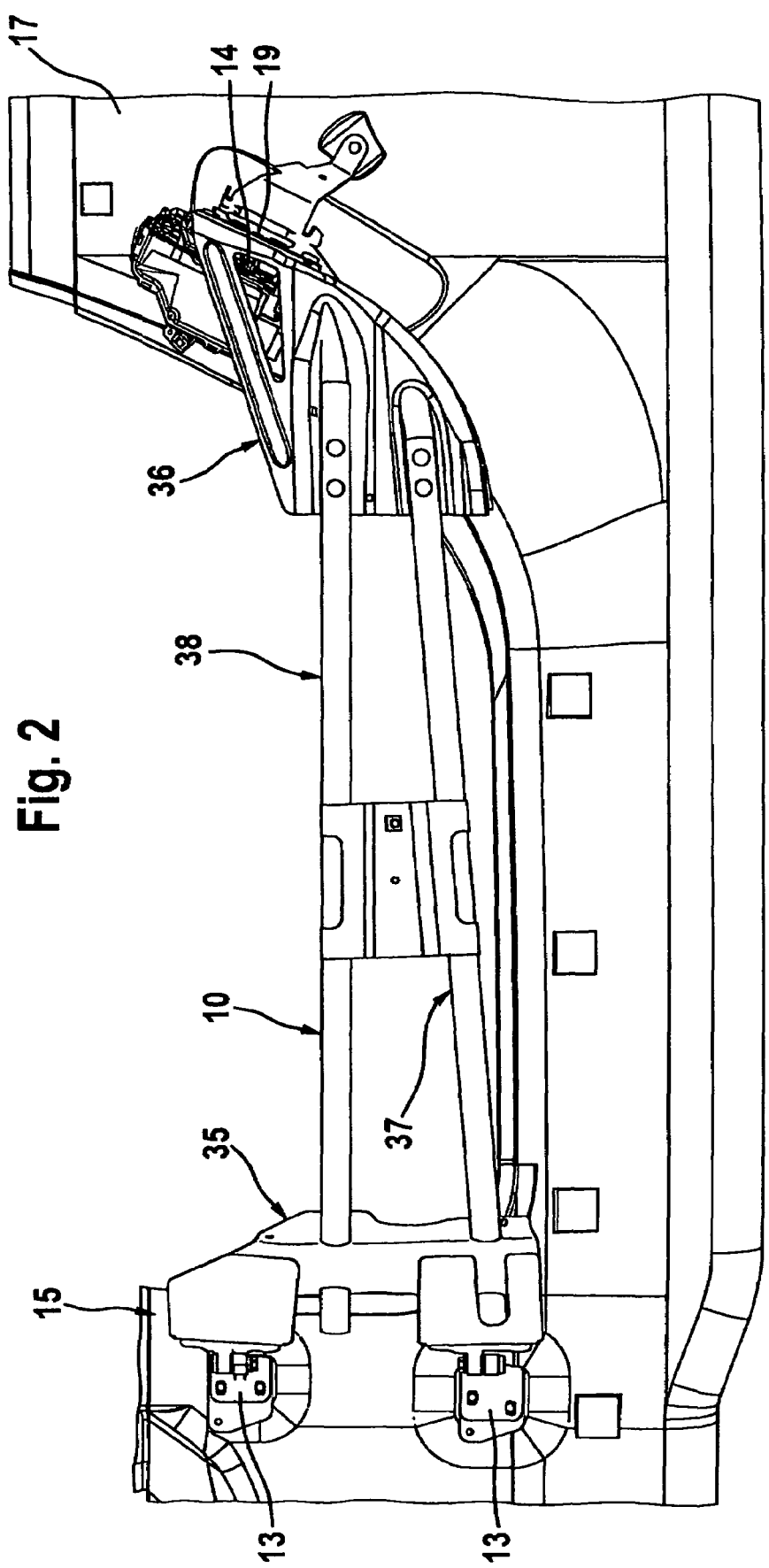
FIG. 2 is an enlarged view in the direction of the arrow A of FIG. 1.
Figure 3:
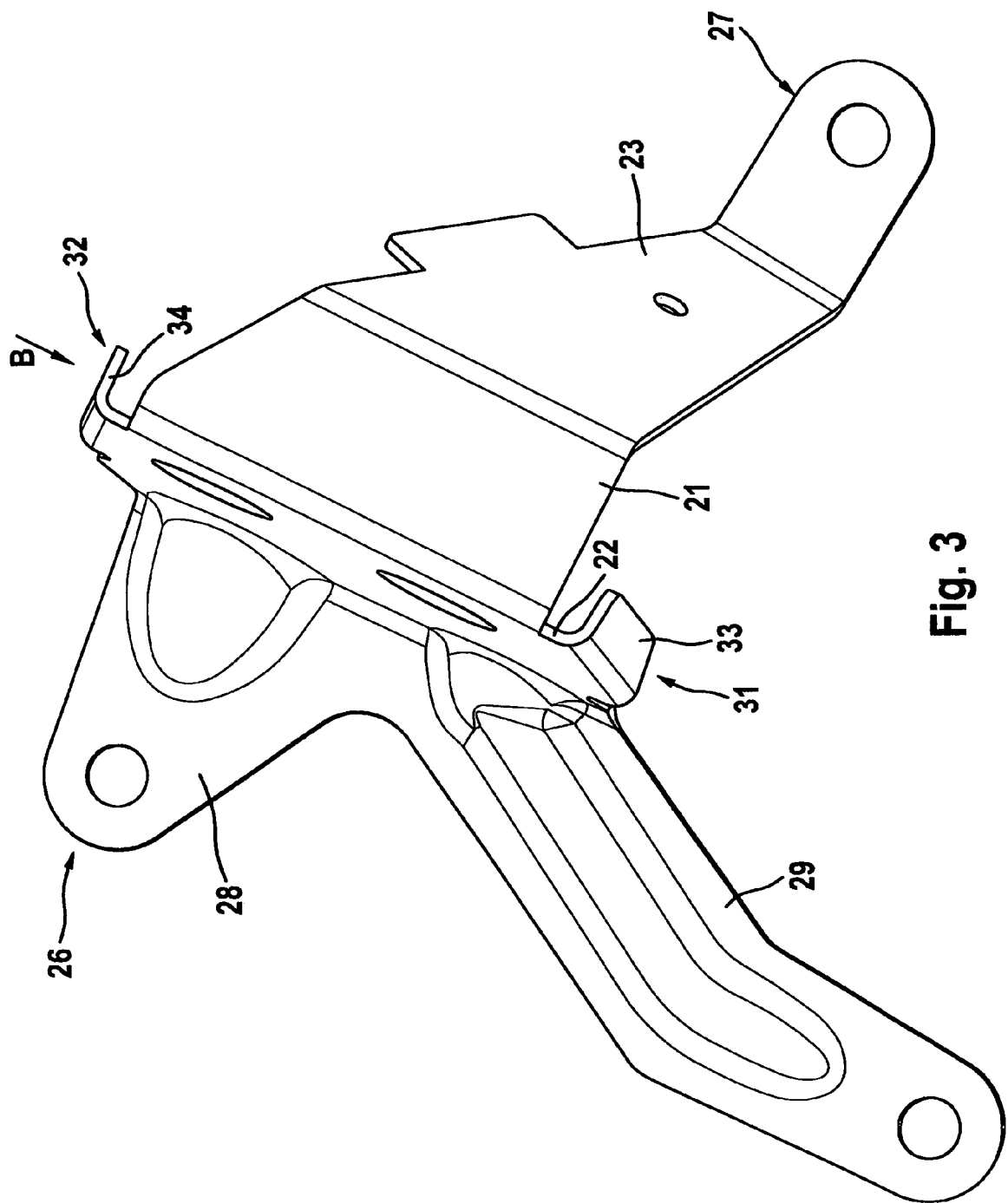
FIG. 3 is an enlarged view of a deformation device of FIG. 2.
Figure 4:
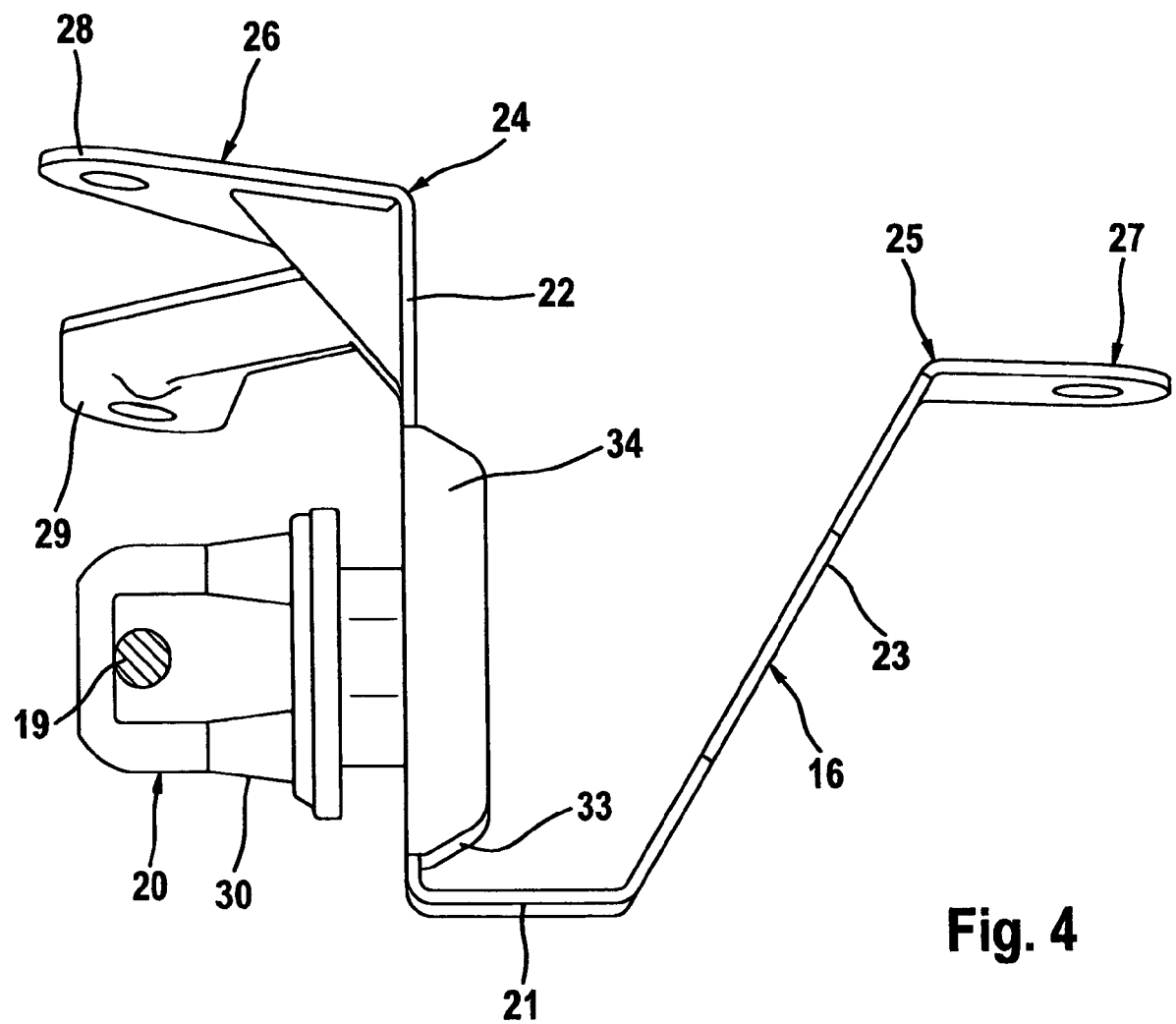
FIG. 4 is a view in the direction of the arrow B of FIG. 3.

Only a door 2 of a motor vehicle 1 is shown which has upright door frames 3 and 4 and a door body 5. The door body 5 is formed by an interior door part 6 and an exterior door part 7 which consist, for example, of a high-strength non-metallic material, such as a glass-fiber-reinforced composite—CFK. In the longitudinal sectional view, the interior door part 6 has a trough-shaped design and has front walls 8 and 9. An impact protection system 10 extends between the door frames 3 and 4 and is provided for protecting occupants situated in a vehicle occupant space 11 of a body 12 of the motor vehicle 1 against lateral accident-caused shocks acting upon the door 2.

Hinges 13 are fastened to one side of the impact protection system 10 and a lock 14 is fastened to the other side, the hinges 13 being connected with a hinge column 15, and the lock 14 interacting with a deformation device 16 which is held in position on another column 17. The hinge column 14 and the column 17 are integrated in a body structure 18 of the body 12. In the closed condition of the door 2—FIG. 1—, the lock 14 interacts by way of an engaging device 19 with a receiving device 20 of the deformation device 16.

The deformation device 16 is constructed in the manner of a cap profile which has first and second legs 22 and 23 connected by means of a web 21, the free ends 24 and 25 of the legs 22 and 23 being provided with supporting webs 26 and 27; the latter are connected with the body structure 18, which may consist of a carbon-fiber-reinforced plastic material. For achieving a defined supporting base, the first supporting web 26 is equipped with an upper arm 28 and a lower arm 29. The receiving device 20, for the engaging device of the lock 14 which is illustrated as a bow 30, is fastened to the first leg 22. In addition, bends 33 and 34, which have a strength-increasing effect, are provided at the opposite ends 31 and 32 of at least the first leg 22.

The impact protection system 10 connected with the front walls 8 and 9 of the interior door part 6 by means of gluing, welding or the like comprises a first console 35 and a second console 36 between which two supporting arms 37 and 38 extend which are constructed as tubes. In this case, the hinges 13 are mounted on the first console 35, and the lock 14 is mounted on the second console 36. The consoles 35 and 36 as well as the supporting elements 37 and 38 are made of metal and are constructed as a prefabricated module representing the impact protection system 10.

In the case of an accident-damage-caused lateral shock onto the impact protection system 10, for example, in the direction of the arrow Pr, tensile forces act upon the connection of the engaging device 19 of the lock 14 and the receiving device 20 of the deformation device 16. At a defined force level, the deformation device 16 will deform while energy is absorbed, specifically, as illustrated in FIG. 1, approximately from position C to position D. However, the engaging device 19 and the receiving device 20 remain in an operative connection, so that the occupants in the vehicle occupant compartment 11 are largely protected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Impact protection system for a door of a motor vehicle, which extends between upright door frames of a door body and, on one side, is connected with a hinge column by way of hinges and, on the other side, adjacent to a lock of the door, is connected with an additional column, which hinge column and additional column are integrated in a body structure of a body of the motor vehicle, wherein the lock is mounted on the impact protection system and, in a closed condition of the door, an engaging device of the door interacts with a receiving device of a deformation device which is fastened to the additional column of the vehicle body structure.

2. Impact protection system according to claim 1, wherein the deformation device is constructed in the manner of a cap profile which comprises first and second legs connected by means of a web, free ends of the legs being connected with supporting webs resting on the additional column of the vehicle body structure.

3. Impact protection system according to claim 2, wherein the receiving device is a bow which is fastened to the first leg.

4. Impact protection system according to claim 1, wherein the engaging device and receiving device are configured to remain in an operative connection during deformation of the deformation device up to a defined tensile load of the impact protection system.

5. Impact protection system according to claim 2, wherein the engaging device and receiving device are configured to remain in an operative connection during deformation of the deformation device up to a defined tensile load of the impact protection system.

6. Impact protection system according to claim 3, wherein the engaging device and receiving device are configured to remain in an operative connection during deformation of the deformation device up to a defined tensile load of the impact protection system.

7. Impact protection system according to claim 1, wherein door hinges are provided at the upright door frame of the door body on one side of the door and the lock is provided on the upright door frame at the other upright door frame, and wherein the hinges are fastened to a first console and the lock is fastened to a second console of the impact protection system, two supporting elements formed by tubes extending between the consoles.

8. Impact protection system according to claim 7, wherein the door body comprises an interior door part with front walls and an exterior door part, and wherein the impact protection system is fastened to the interior door part, the consoles on the front walls being connected with the interior door part by a fastening device.

9. Impact protection system according to claim 8, wherein at least the interior door part is made of a non-metallic high-strength material and the impact protection system consists essentially of metal.

10. Impact protection system according to claim 8, wherein the non-metallic high strength material is a glass fiber reinforced composite material.

11. Impact protection system according to claim 8, wherein the consoles and the supporting elements are constructed as a prefabricated module representing the impact protection system.

12. Impact protection system according to claim 7, wherein the deformation device is constructed in the manner of a cap profile which comprises first and second legs connected by means of a web, free ends of the legs being connected with supporting webs resting on the additional column of the vehicle body structure.

13. Impact protection system according to claim 8, wherein the deformation device is constructed in the manner of a cap profile which comprises first and second legs connected by means of a web, free ends of the legs being connected with supporting webs resting on the additional column of the vehicle body structure.

14. Impact protection system according to claim 9, wherein the deformation device is constructed in the manner of a cap profile which comprises first and second legs connected by means of a web, free ends of the legs being connected with supporting webs resting on the additional column of the vehicle body structure.

15. Impact protection system according to claim 7, wherein the receiving device is a bow which is fastened to the first leg.

16. Impact protection system according to claim 8, wherein the receiving device is a bow which is fastened to the first leg.

17. Impact protection system according to claim 9, wherein the receiving device is a bow which is fastened to the first leg.

18. Impact protection system according to claim 7, wherein the engaging device and receiving device are configured to remain in an operative connection during deformation of the deformation device up to a defined tensile load of the impact protection system.

19. Impact protection system according to claim 8, wherein the engaging device and receiving device are configured to remain in an operative connection during deformation of the deformation device up to a defined tensile load of the impact protection system.

20. Impact protection system according to claim 9, wherein the engaging device and receiving device are configured to remain in an operative connection during deformation of the deformation device up to a defined tensile load of the impact protection system.

21. A vehicle body assembly comprising:
    a first body column, a second body column spaced from the first body column to define a door accommodating space between the first and second body columns, a door disposed between the first and second body columns which is hingedly supported at the first body column, a door lock disposed adjacent the second body column when the door is in a closed position, an impact force transfer assembly in said door, and a deformation device fastened to the second body column, said deformation device including a receiving device, wherein the door lock is mounted on the impact force transfer assembly and has an engaging device which engages with the receiving device when the door is in a locked condition to thereby transfer collision forces acting on the door through the impact force transfer assembly to the deformation device.

22. A vehicle body assembly according to claim 21, wherein the deformation device is constructed in the manner of a cap profile which comprises first and second legs connected by means of a web, free ends of the legs being connected with supporting webs resting on the second column of the vehicle body structure.

23. A vehicle body assembly according to claim 22, wherein the receiving device is a bow which is fastened to the first leg.

24. A vehicle body assembly according to claim 21, wherein the engaging device and receiving device are configured to remain in an operative connection during deformation of the deformation device up to a defined tensile load of the impact protection system.

25. A vehicle body assembly according to claim 21, wherein the force transfer assembly includes a first console connected with the hinges, a second console connected with the lock, and at least one supporting member connecting the first and second consoles with one another.

26. A vehicle body assembly according to claim 25, wherein the at least one supporting member is a connecting tube.

27. A vehicle body assembly according to claim 25, wherein the at least one supporting member includes a pair of connecting tubes.

28. A vehicle body assembly according to claim 25, wherein the door is a hollow door formed of an interior door part with first and second end walls located adjacent the respective first and second body columns and an exterior door part connected to the interior door part, and wherein the first console is fixedly connected with the first end wall and the second console is fixedly connected with the second end wall.

29. A vehicle body assembly according to claim 26, wherein the door is a hollow door formed of an interior door part with first and second end walls located adjacent the respective first and second body columns and an exterior door part connected to the interior door part, and wherein the first console is fixedly connected with the first end wall and the second console is fixedly connected with the second end wall.

30. A vehicle body assembly according to claim 29, wherein the connecting tube and deformation device are formed of metal and the interior door part is formed of a glass fiber reinforced composite material.

* * * * *